US 12,541,727 B2

(12) United States Patent
Singh et al.

(10) Patent No.: US 12,541,727 B2
(45) Date of Patent: Feb. 3, 2026

(54) SELECTING EXPERTISE TAGS TO PRESENT IN A USER APPLICATION DURING FULFILLMENT OF AN ORDER BY AN ONLINE SYSTEM

(71) Applicant: Maplebear Inc., San Francisco, CA (US)

(72) Inventors: Aakash Singh, Toronto (CA); Levon Dolbakian, Berkeley, CA (US); Hannah Gardner, Toronto (CA); Kelvin Lau, Vancouver (CA); Bryan Tran, Brooklyn, NY (US); Fangzhou Wang, Oakland, CA (US); Ajay Pankaj Sampat, San Francisco, CA (US); Jaclyn Tandler, San Francisco, CA (US)

(73) Assignee: Maplebear Inc., San Francisco, CA (US)

(*) Notice: Subject to any disclaimer, the term of this patent is extended or adjusted under 35 U.S.C. 154(b) by 141 days.

(21) Appl. No.: 18/522,035

(22) Filed: Nov. 28, 2023

(65) Prior Publication Data

US 2025/0173642 A1    May 29, 2025

(51) Int. Cl.
*G06Q 10/0631* (2023.01)
*G06Q 10/087* (2023.01)
*G06Q 30/0601* (2023.01)

(52) U.S. Cl.
CPC ... *G06Q 10/063112* (2013.01); *G06Q 10/087* (2013.01); *G06Q 30/0635* (2013.01); *G06Q 30/0641* (2013.01)

(58) Field of Classification Search
None
See application file for complete search history.

(56) References Cited

U.S. PATENT DOCUMENTS

| 10,402,902 B1 * | 9/2019 | Isaacson | G06Q 40/04 |
| 10,740,842 B1 * | 8/2020 | Isaacson | G06Q 40/04 |

(Continued)

FOREIGN PATENT DOCUMENTS

| WO | WO-2005074629 A2 * | 8/2005 | G06Q 30/02 |
| WO | WO-2016004240 A1 * | 1/2016 | H04N 21/8583 |
| WO | WO-2016012742 A1 * | 1/2016 | G06Q 10/087 |

OTHER PUBLICATIONS

Olivia "Drive Your Business with Predictive Analytics", Dec. 2012, SAS, pp. 1-10 (Year: 2012).*

*Primary Examiner* — Romain Jeanty
(74) *Attorney, Agent, or Firm* — Fenwick & West LLP (57) ABSTRACT

An online concierge system selects picker expertise tags that showcase abilities or experiences of pickers that fulfill orders for the system. The online concierge system establishes a set of user-order cohorts based on characteristics of orders and users placing the orders. When an order is received, the online concierge system identifies a relevant user-order cohort and applies a trained model to predict, in the context of the user-order cohort, the performance of various candidate picker expertise tags applicable to the order. The trained model may be generated via a training and testing process in which different picker expertise tags are tested in the context of a user-order cohort, and performance metrics are observed to learn which picker expertise tags perform best in the context of a user-order cohort.

20 Claims, 4 Drawing Sheets (56) References Cited

U.S. PATENT DOCUMENTS

| | | | | |
|---|---|---|---|---|
| 2006/0025883 A1* | 2/2006 | Reeves | ............... | G06Q 10/08 |
| | | | | 700/216 |
| 2013/0007009 A1* | 1/2013 | Caldwell | ............ | G06F 16/337 |
| | | | | 707/E17.014 |
| 2017/0301002 A1* | 10/2017 | Wilkinson | ......... | G06Q 30/0631 |
| 2020/0311652 A1* | 10/2020 | Morin | ................. | G06Q 10/06 |

* cited by examiner

SELECTING EXPERTISE TAGS TO PRESENT IN A USER APPLICATION DURING FULFILLMENT OF AN ORDER BY AN ONLINE SYSTEM

BACKGROUND

In an online concierge system, users may select items for ordering, procurement, and delivery from physical retailers or other warehouses. After submitting an order, the online concierge system assigns a shopper (i.e., "picker") to obtain the items for the user. Pickers may have varying experience levels and expertise that may render certain pickers particularly suitable for facilitating certain orders. For example, some pickers may be very experienced with selecting quality produce, some pickers may be more experienced picking items from international-themed groceries, and some pickers may have expertise in selecting cuts of meat from a butcher while others are more experienced selecting vegetarian items. To establish a user's confidence in the order, it can be beneficial to provide feedback to the user regarding the picker's specific expertise.

Feedback about a picker's expertise can be provided to a user, e.g., in a user interface of a user application, such as in a native application or web page where the user can track an order. But due to the limited screen space in such a user interface where the picker's credentials can be displayed, it may be technically infeasible to present all of the relevant information about a picker's expertise, so it may be necessary to select a subset of the picker's expertise to present. However, a challenge exists in identifying which credentials of the picker are the most relevant to the user in association with a particular order. In particular, selecting an optimal expertise of a picker to show to a user for a particular order may depend on a large dataset of information and on patterns in that dataset that cannot be intuited manually, especially where that dataset includes information about picker expertise shown to users for previous orders and the users' responses thereto. Accordingly, there exists a need for a system that programmatically selects a picker's expertise to show to a user that optimizes for a user's satisfaction with or response to being presented with that information.

SUMMARY

To address the above-described problems, an online concierge system intelligently selects user expertise tags that highlight abilities and/or experiences of a picker assigned to fulfill orders for users of an online concierge system. The online concierge system receives an order from a user via a user client device of the online concierge system. The order includes one or more items available from a warehouse for procurement and delivery to the user. The online concierge system accesses a trained model for selecting one or more picker expertise tags associated with a picker for the order. The online concierge system applies the trained model to characteristics of the user and/or characteristics of the order to select the one or more picker expertise tags predicted by the trained model to optimize performance according to one or more performance metrics. The online concierge system sends the picker expertise tags to the user client device for presentation during procurement of the order.

In one or more embodiments, the performance metrics comprises at least one of: an engagement rate between users and pickers, tips submitted by the users for the pickers, or selections by the users to mark the pickers as favorites.

In one or more embodiments, the online concierge system configures a carousel user interface element with the one or more picker expertise tags that rotates between presentation of the one or more picker expertise tags.

In one or more embodiments, the online concierge system obtains the characteristics of the order and the characteristics of the user and assigns the order to a user-order cohort selected from a predefined set of user-order cohorts based on these characteristics. The online concierge system then applies the training model to generate the shopper expertise tags to optimize performance in context of the user-order cohort.

In one or more embodiments, after receiving the order, the online concierge system assigns a picker to the order to procure the one or more items from the warehouse for the user. The online concierge system identifies a set of candidate picker expertise tags for the picker by applying a set of predefined templates to characteristics of the picker. The online concierge system then selects the one or more picker expertise tags from the set of candidate picker expertise tags for the picker.

In one or more embodiments, the online concierge system identifies a pool of candidate pickers for the order and identifies a set of candidate picker expertise tags for the pool of candidate pickers by applying a set of predefined templates to respective characteristics of the respective candidate pickers. The online concierge system generates, based on the trained model, respective predicted performance metrics for the set of candidate picker expertise tags for the pool of candidate pickers. The online concierge system selects the picker and the one or more picker expertise tags corresponding to the picker based at least in part on the respective predicted performance metrics for the set of candidate picker expertise tags derived for the pool of candidate pickers.

In one or more embodiments, the model is trained using various machine learning and testing techniques. For example, the online concierge system may establish a set of user-order cohorts representing groups of historical orders having similar characteristics relating to the historical orders and users placing the historical orders. The online concierge system then tests, for each of the set of user-order cohorts, different candidate picker expertise tags and observes respective performance results. The online concierge system then learns the trained model based on observed relationships between the different candidate picker expertise tags and the respective performance results in the contexts of the respective user-order cohorts.

In one or more embodiments, testing the different candidate picker expertise tags may comprise applying A/B testing to select and test two or more different candidate picker expertise tags for different subsets of orders in respective user-order cohorts.

In one or more embodiments, the online concierge system may apply a multi-arm bandit algorithm to test performance of two or more different picker expertise tags for each of the user-order cohorts and learn the trained model.

In further embodiments, a non-transitory computer-readable storage medium stores instructions executable by a processor for carrying out any of the processes described herein. Furthermore, a computer system may include one or more processors and a non-transitory computer-readable storage medium as described herein.

DETAILED DESCRIPTION

Figure 1:
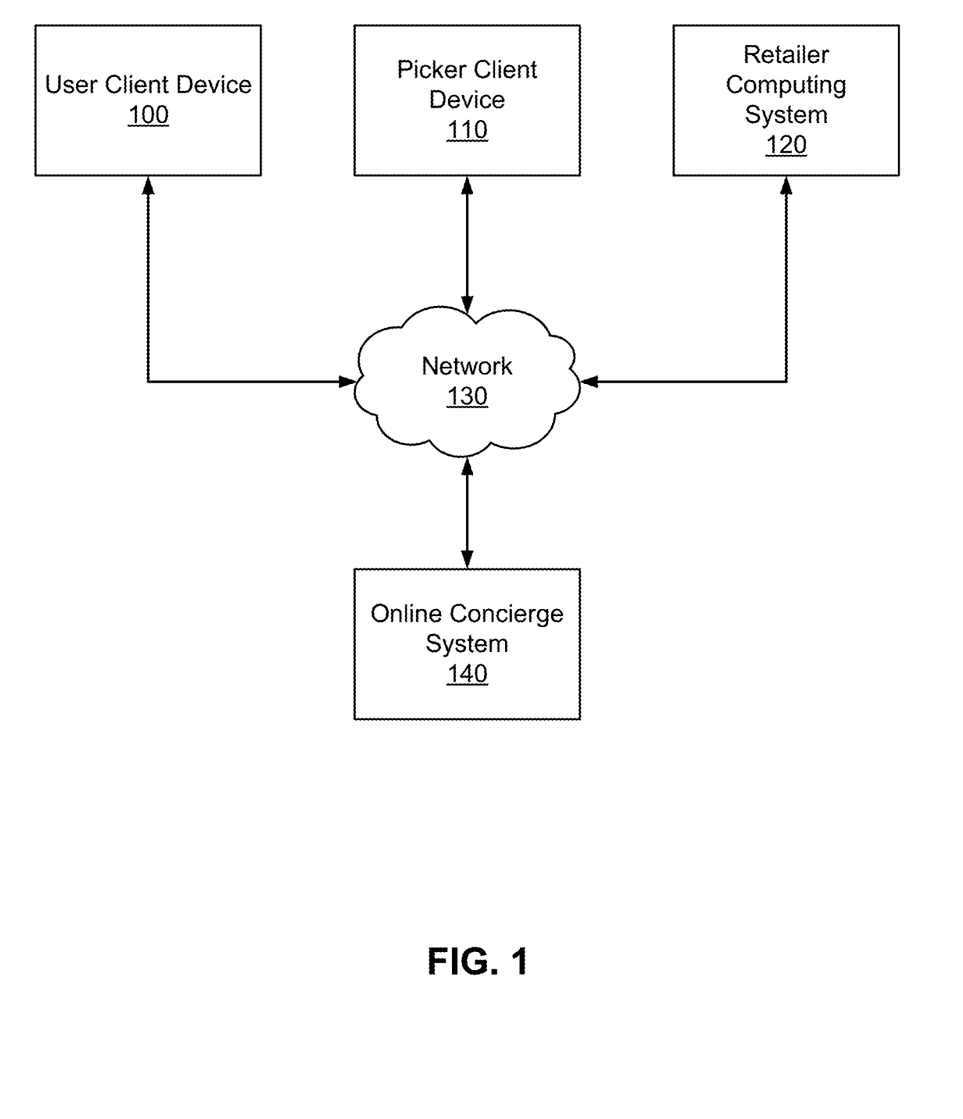
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a user client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, users, pickers, and retailers may be generically referred to as "users" of the online concierge system 140. Additionally, while one user client device 100, picker client device 110, and retailer computing system 120 are illustrated in FIG. 1, any number of users, pickers, and retailers may interact with the online concierge system 140. As such, there may be more than one user client device 100, picker client device 110, or retailer computing system 120.

The user client device 100 is a client device through which a user may interact with the picker client device 110, the retailer computing system 120, or the online concierge system 140. The user client device 100 can be a personal or mobile computing device, such as a smartphone, a tablet, a laptop computer, or desktop computer. In some embodiments, the user client device 100 executes a client application that uses an application programming interface (API) to communicate with the online concierge system 140.

A user uses the user client device 100 to place an order with the online concierge system 140. An order specifies a set of items to be delivered to the user. An "item," as used herein, means a good or product that can be provided to the user through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online concierge system 140. The ordering interface may be part of a client application operating on the user client device 100. The ordering interface allows the user to search for items that are available through the online concierge system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected.

The user client device 100 may receive additional content from the online concierge system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online concierge system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a user's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the user client device 100 for display to the user such that the user can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The user client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which users can order items to be provided to them by a picker from a retailer. The online concierge system 140 receives orders from a user client device 100 through the network 130. The online concierge system 140 selects a picker to service the user's order and transmits the order to a picker client device 110 associated with the picker. The picker collects the ordered items from a retailer location and delivers the ordered items to the user. The online concierge system 140 may charge a user for the order and provides portions of the payment from the user to the picker and the retailer.

As an example, the online concierge system 140 may allow a user to order groceries from a grocery store retailer. The user's order may specify which groceries they want delivered from the grocery store and the quantities of each of the groceries. The user client device 100 transmits the user's order to the online concierge system 140 and the online concierge system 140 selects a picker to travel to the grocery store retailer location to collect the groceries ordered by the user. Once the picker has collected the groceries ordered by the user, the picker delivers the groceries to a location transmitted to the picker client device 110 by the online concierge system 140. The online concierge system 140 is described in further detail below with regards to FIG. 2.

Figure 2:
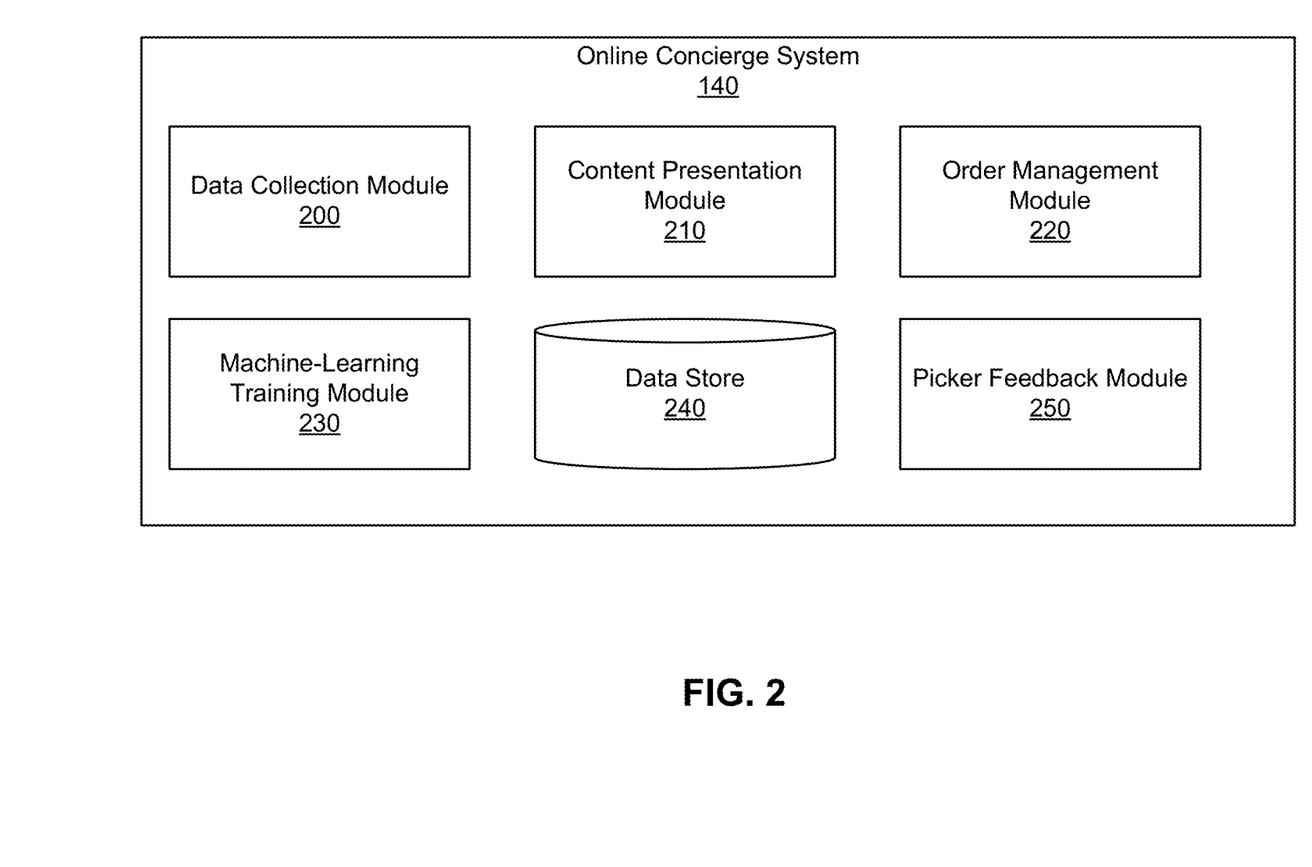
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default retailer/retailer location, payment instrument, delivery location, or delivery timeframe. The data collection module 200 may collect the user data from sensors on the user client device 100 or based on the user's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the user client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a user rating for the picker, which retailers the picker has collected items at, or the picker's previous shopping history. Additionally, the picker data may include preferences expressed by the picker, such as their preferred retailers to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a user associated with the order, a retailer location from which the user wants the ordered items collected, or a timeframe within which the user wants the order delivered. Order data may further include information describing how the order was serviced, such as which picker serviced the order, when the order was delivered, or a rating that the user gave for the order.

The content presentation module 210 selects content for presentation to a user. For example, the content presentation module 210 selects which items to present to a user while the user is placing an order. The content presentation module 210 generates and transmits the ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine learning models and may be stored in the data store 240.

In some embodiments, the content presentation module 210 scores items based on a search query received from the user client device 100. A search query is text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weigh the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to assign an order to a picker based on a delivery timeframe requested by the user with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order, or to an offsite staging area where items have been preemptively picked. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location or other staging area. When the picker arrives, the order management module 220 transmits the order to the picker client device 110 for display to the picker. As the picker uses the picker client device 110 to collect items at the retailer location or other staging location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of their order. In some embodiments, the order management module 220 computes an estimated time of arrival for the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include user data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores user data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

The picker feedback module 250 generates picker expertise tags to be displayed in the user client device 100 in association with an order. The picker expertise tags may indicate one or more credentials associated with the picker assigned to the order that may beneficially showcase the picker's expertise and inspire confidence in the user. Examples of picker expertise tags may include tags such as: "Known for picking quality produce;" "Favorited by 57 users;" "Known for picking vegetarian products;" "Has picked 624 avocados before;" "Shopped at [this retail store] 289 times before;" "Has previously picked turkey for Thanksgiving roast;" "Has previously picked baby diapers and wipes at [this retail store]"; or "Has previously picked culturally specialized items."

In one or more embodiments, the available picker expertise tags may be generated from templates that are predefined by an administrator of the online concierge system 140. For example, a template for a picker expertise tag may indicate "Favorited by {favorite count} users" where {favorite count} represents a value generated from statistical data associated with the picker. Another example may indicate "Shopped for {item in order} {number times item shopped} times" where {item in order} represents an item from the order and {number of time item shopped} represents a count of how many times the picker has previously shopped for that item. In the context of a particular order, application of all available templates may generate tens, hundreds, or thousands of possible picker expertise tags for a candidate picker. However, a significant number of possible picker expertise tags may be irrelevant or counterproductive to the goal of inspiring user confidence. Therefore, the possible picker expertise tags are intelligently evaluated to predict which tags are most applicable in the relevant context. For example, the online concierge system 140 may select from among the candidate picker expertise tags in order to optimize one or more predicted performance metrics, which may be based on factors such as predicted engagement rates indicative of likelihood of the user interacting with the picker expertise tags, likelihood and/or values of predicted tips that the user may submit for the picker when the picker expertise tags are shown, likelihood that the user will tag the picker as a "favorite," when the picker expertise tags are shown or other metrics.

In one or more embodiments, the picker feedback module 250 applies a trained model to generate the selection between candidate picker expertise tags available in association with a particular order. The inputs to the trained model may include characteristics of the user and characteristics of the order such that even for the same assigned picker, a user may be presented with different picker expertise tags depending on the items in the order. Examples of inputs to the trained model may include, for example, a number of times the user has been previously paired with the picker; a number of times the picker has shopped at the retailer; user profile information of the user such as: dietary preferences of the user, a number of orders previously placed by the user, a preferred language of the user; characteristics of items in the order such as quantities of items in the order, a dollar value of items in the order, a picker's prior experience picking high-value and/or foundational items in the order, item categories of the items in the order, dietary preferences associated with items in the order; user metrics associated with previous orders such as prior order issues reported by the user; picker profile information such as: a dietary preference associated with the picker, known languages of the picker, number of orders completed by the picker, a status tier of the picker (e.g., indicating whether the picker has achieved certain order quantity thresholds), completed training courses, number of users who selected the picker as a "favorite," past history picking specific holiday or festival items, past history picking items at specialty stores; picker metrics from previous fulfilled orders such as: number of 5-star ratings, found rate, accuracy score, a sentiment analysis performed on user feedback comments, previously shopped items, previously shopped item categories, number of timely deliveries, number of hours saved, top compliments from previous users, liked/approved replacement rate from previous users, etc.

Based on the various inputs, the trained model may output respective performance scores associated with different candidate picker expertise tags applicable to the picker for an order. The picker feedback module 250 may then select one or more highest performing picker expertise tags to present. Alternatively, the trained model may directly output one or more picker expertise tags predicted to achieve highest performance in the context of the order.

In one or more embodiments, the picker feedback module 250 trains the model during a training and testing process. Here, the picker feedback module 250 may initially establish user-order cohorts that comprise respective groupings of orders having similar characteristics (e.g., based on one or more predefined similarity metrics) relating to the order and users placing the orders. For example, orders may be assigned to a user-order cohort in a manner such that different candidate picker expertise tags are predicted to achieve similar performance for the orders grouped in the user-order cohort. In contrast, picker expertise tags may achieve very different performance for orders grouped into different user-order cohorts. For each user-order cohort, the picker feedback module 250 may determine, from historical data obtained during testing, observed performance metrics associated with presenting different picker expertise tags in association with orders in the user-order cohort. The model may then be trained to learn the relationships between the picker expertise tags and the resulting performance metrics when presented in the context of a particular user-order cohort.

In one or more embodiments, selection of the picker expertise tags to present during training and testing may be based on an A/B testing technique in which two or more different picker expertise tags are presented for different subsets of similarly situated orders (i.e., an "A" subset and a "B" subset) in order to enable direct comparison of performance in the different subsets. The outcomes of the A/B test may then be applied to a machine learning algorithm to learn a model for mapping the picker expertise tags to different performance metrics in the context of a user-order cohort. In one or more embodiments, selection of picker expertise tags to present during training and training of the model may be performed via a multi-arm bandit (MAB) algorithm that intelligently selects different combinations of picker expertise tags to present for different orders and trains the model to predict the resulting performance metrics.

In an inference stage (once at least a baseline model is trained), an order may first be associated with one of the user-order cohorts based on the characteristics of the order and the user. Then, the trained model is applied to predict the performance metrics for various candidate picker expertise tags in the context of the assigned user-order cohort. One or more top performing picker expertise tags may then be selected based on the predicted performance metrics.

In one or more embodiments, the trained model may be updated periodically based on observed performance results of the selected picker expertise tags selected by the trained model. Thus, the trained model may improve its predictive power over time as additional data is obtained through operation of the online concierge system 140.

In one or more embodiments, the order management module 220 first assigns the picker to the order based on picker availability or other factors (e.g., as described above with respect to the order management module 220). Once the picker is assigned, the picker feedback module 250 may obtain one or more candidate picker expertise tags associated with the picker (e.g., based on a predefined set of templates) and then apply the trained model described above to determine which picker expertise tags to present in the specific context of the order and the user placing the order.

In one or more embodiments, the picker feedback module 250 first applies the trained model to predict performance metrics associated with a pool of picker expertise tags (that may apply to different pickers). The order management module 220 may then assign the picker based in part on the picker having one or more high performing picker expertise tags available. Here, selection of the picker may be made based on a ranking of pickers derived from the expected performance of available picker expertise tags in combination with other factors, such as location of the picker relative to the retailer, availability of the picker, etc.

In one or more embodiments, the picker feedback module 250 may output the selected picker expertise tags for presentation in the carousel banner that is presented in the user client device 100. For example, the carousel banner may be presented in conjunction with an order status page that is presented after the order has been submitted and while it is being fulfilled. This order status page may include other information associated with the order such as an order status, a time until delivery, a number of items remaining to be picked, any procurement exceptions (e.g., for unavailable items), etc. The carousel banner may comprise a rotating set of picker expertise tags that may be rotated over time or in response to a user action. For example, the carousel banner may include a set of five picker expertise tags and present one or two picker expertise tags at a time. The carousel banner may automatically rotate on a periodic basis (e.g., every few seconds) or may rotate in response to a user selection to scroll through individual picker expertise tags associated with the carousel banner. In one or more embodiments, the individual picker expertise tags may be ordered in the carousel banner based on their respective relevance to the order.

Figure 3:
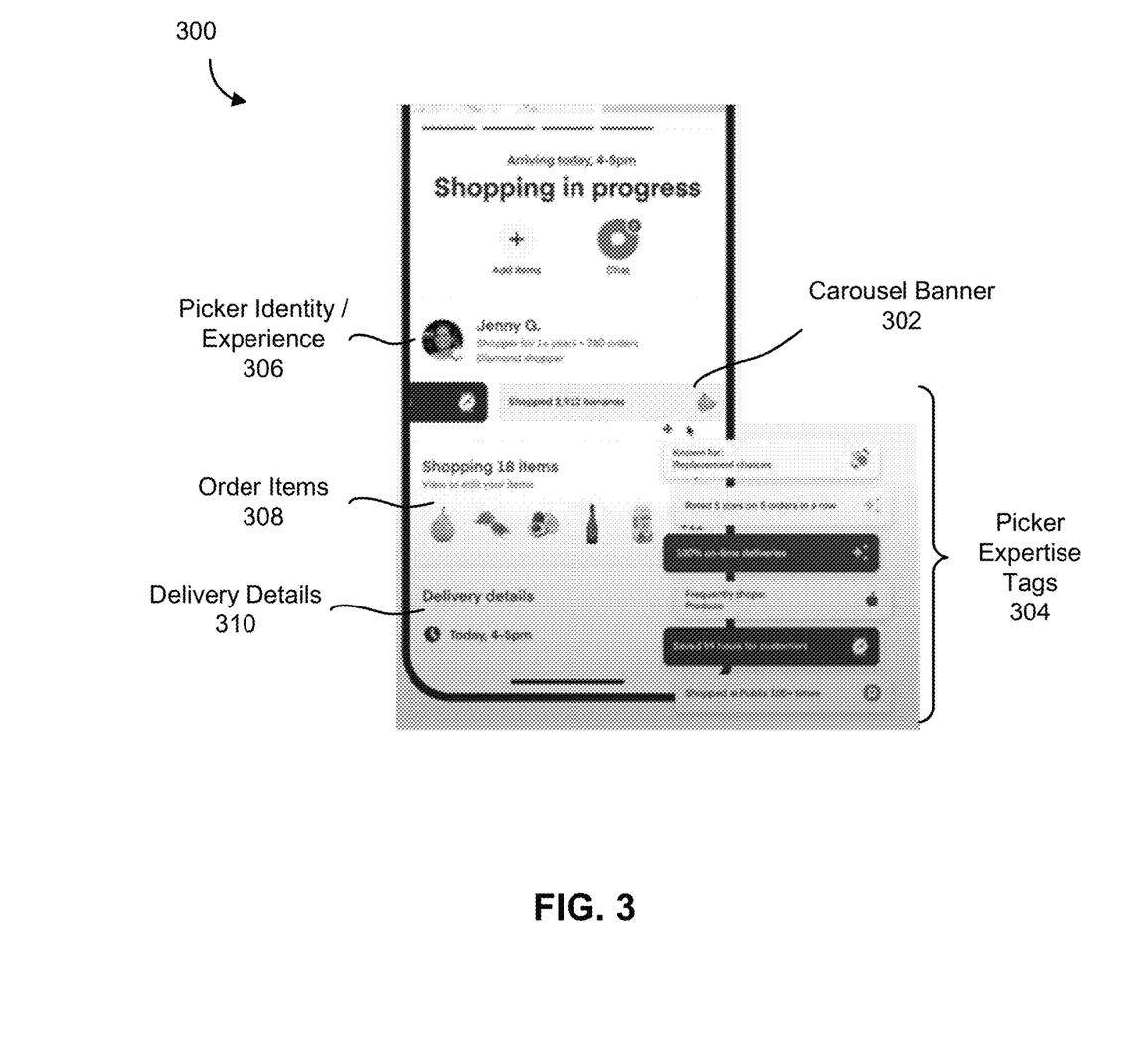
FIG. 3 illustrates one or more embodiments of an order status interface that presents shopper expertise tags associated with a picker assigned to an order.

FIG. 3 is an example user interface 300 associated with presentation of picker expertise tags. The interface 300 may be presented in the user client device 100 after an order is placed and assigned to a picker, and while shopping is in progress. The picker identity and experience 306 presents various information about the picker such as picker name, portrait image, length of time working as a shopper, number of orders fulfilled, and tier status. The order items 308 indicate the number of items being shopped for and may include images associated with the various items. The delivery details 310 indicates the estimated delivery time for the order. The carousel banner 302 presents the picker expertise tags 304, which may rotate over time. Because FIG. 3 represents a snapshot of the interface 300, it shows one of the picker expertise tags 304 ("Shopped 2,912 bananas"). The other picker expertise tags 304 are illustrated as overlay in FIG. 3 but are not shown at the same time. Rather, the remaining picker expertise tags 304 may be rotated into the carousel banner 302 over time (e.g., periodically and/or in response to a user action). These picker expertise tags may include tags such as "Known for: Replacement choices," "Rated 5 stars on 5 orders in a row," "100% on-time deliveries," "Frequently shops: Produce," "Saved 99 hours for users," and "Shopped at Publix 100+ times." The specific tags 304 for inclusion in the carousel banner 302 may be selected using the various techniques described above in which the tags 304 are identified to achieve high predicted performance (according to a predefined performance metric) in the context of the specific order and the user placing the order.

Figure 4:
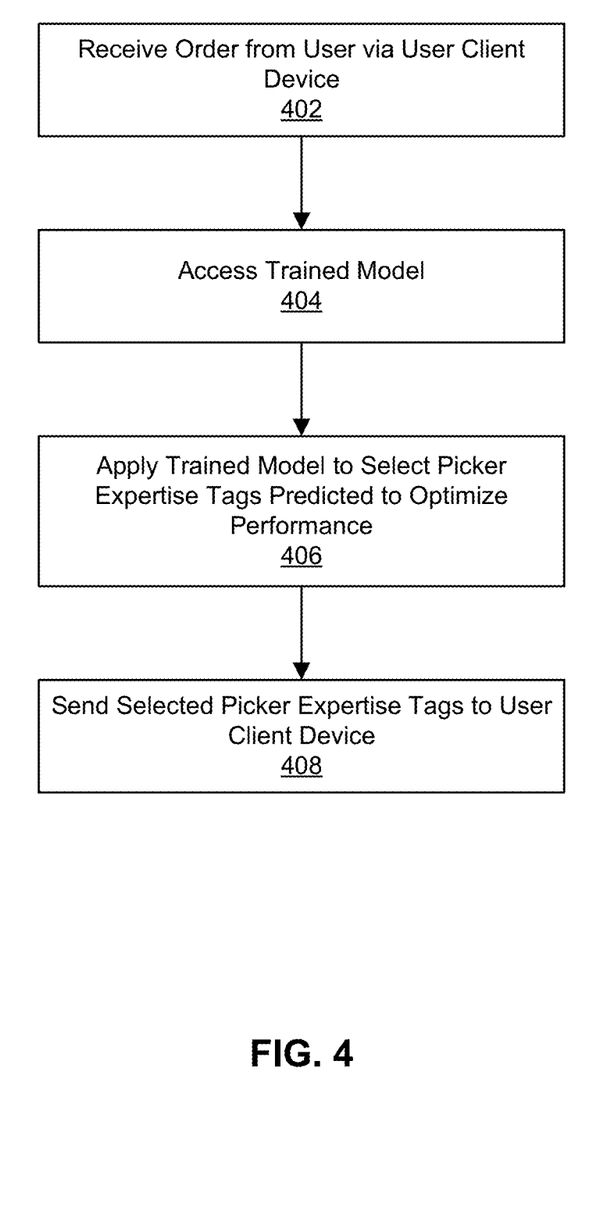
FIG. 4 is a flowchart illustrating one or more embodiments of a process for selecting shopper expertise tags for presentation in a user client device of an online concierge system.

FIG. 4 is a flowchart illustrating a method for selecting picker expertise tags for presenting in association with an order being fulfilled by a picker in an online concierge system 140. Alternative embodiments may include more, fewer, or different steps from those illustrated in FIG. 4, and the steps may be performed in a different order from that illustrated in FIG. 4. These steps may be performed by an online concierge system (e.g., online concierge system 140). Additionally, each of these steps may be performed automatically by the online concierge system 140 without human intervention.

The online concierge system 140 receives 402 an order from a user via a user client device 100. The order includes one or more items available from a warehouse for procurement and delivery to the user using the techniques described above. The online concierge system 140 obtains 404 a trained model for selecting one or more picker expertise tags associated with a picker for the order. The online concierge system 140 applies 406 the trained model based on characteristics of the user and characteristics of the order to select one or more picker expertise tags predicted by the trained model to optimize performance according to one or more performance metrics. The selected picker expertise tags are then sent 408 to the user client device 100 for presentation on an order status interface presented during procurement of the order.

The picker expertise tags may be presented in a carousel banner user interface element. Here, the carousel banner may rotate between presentation of the one or more picker expertise tags periodically or based on a user interaction.

In one or more embodiments, the trained model is trained according to different user-order cohorts that each represent a grouping of orders having similar characteristics relating to the order and the user placing the order. Here, upon receiving an order, the online concierge system 140 may identify, from a predefined set of user-order cohorts, a best matching user-order cohort most relevant to the current order. The selected user-order cohort may then be applied as an input to the trained model to generate predicted performance metrics for various possible picker expertise tags in the context of the identified user-order cohort.

In one or more embodiments, the online concierge system 140 first assigns a picker to an order and then selects from among a set of picker expertise tags applicable to the assigned picker. Here, the picker may be assigned based on picker availability, relative location of the picker to the retailer, picker experience, or other factors.

In one or more embodiments, the online concierge system 140 may evaluate picker expertise tags associated with multiple candidate pickers, identify the highest performing picker expertise tags, and then assign the picker from the multiple candidate pickers based in part on identifying the highest performing picker expertise tags. For example, a picker having a set of high performing picker expertise tags associated with an order (as predicted by the trained model) may be more likely to be assigned to the order than a picker with lower performing tags (as predicted by the model).

In one or more embodiments, the trained model is trained according to a training process that observes performance of various picker expertise tags presented in the context of different user-order cohorts and learns mappings between the user-order cohorts and performance of historically presented picker expertise tags. To facilitate training, the online concierge system 140 may establish a set of user-order cohorts (e.g., based on historical data) that represent groups of orders having similar characteristics of the order and the user placing the order. For orders matched to a given user-order cohort, the online concierge system 140 may then facilitate testing of different picker expertise tags by presenting different picker expertise tags for orders belonging to the same user-order cohort and observing resulting performance metrics. The performance metrics comprises at least one of: an engagement rate between users and pickers, tips submitted by the users for the pickers, and selections by the users to mark the pickers as favorites. During testing, a A/B testing technique may be used to select which picker expertise tags to present for a particular order. A machine learning algorithm may then be employed to train the model based on the results of the A/B testing. In one or more embodiments, a multi-arm bandit algorithm may be employed to select the picker expertise tags for testing and training the model.

Embodiments are described herein in connection with an online concierge system that uses pickers to fulfill orders by picking items at a warehouse and then delivers the items to a user. However, one or more other embodiments can be used with other types of services. In particular, one or more embodiments of the expertise selection process described herein can be used to select the expertise of any kind of fulfillment agent where a system selects a particular fulfillment agent to fulfill a request for a user, and where the fulfillment agent's expertise may be relevant to a user. This includes systems where fulfillment agents are selected to perform services for a user (e.g., medical services or house cleaning services), to provide transportation for users (e.g., ride-sharing services), or provide information to users (e.g., tutoring services or therapists), just to name a few.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising one or more processors and a computer-readable medium, the method comprising:
    receiving an order from a user of an online concierge system via a user client device, the order including one or more items from a warehouse for procurement and delivery to the user;
    identifying a picker assigned to fulfill the order;
    accessing a model trained to select one or more expertise tag templates from a plurality of expertise tag templates;
    applying the model to select one or more expertise tag templates for the received order, wherein the model selects the one or more expertise tag templates based on observed performance of expertise tags used for previous orders;
    generating one or more expertise tags for the identified picker, wherein each picker expertise tag contains information about the picker's historical fulfillment of orders inserted into the selected one or more expertise tag templates; and
    sending, to the user client device, the generated expertise tags, thereby causing the user client device to update a display having a limited display area to present the generated expertise tags to the user during procurement of the order.

2. The method of claim 1, wherein applying the model to select one or more expertise tag templates for the received order comprises:
    assigning the order to a user-order cohort selected from a predefined set of user-order cohorts, wherein the order is assigned based at least in part on information about the user or information about the order; and
    providing the assigned user-order cohort to the model, wherein the model is trained to select the one or more expertise tag templates based on observed performance of expertise tags used for previous orders that are in the assigned user-order cohort.

3. The method of claim 1, wherein the model is trained according to a process comprising:
    establishing a plurality of user-order cohorts representing groups of historical orders having similar characteristics relating to the historical orders and users placing the historical orders;
    testing, for each of the plurality of user-order cohorts, different candidate picker expertise tags and observing respective performance results; and
    learning the model based on observed relationships between the different candidate picker expertise tags and the respective performance results in respective contexts of the plurality of user-order cohorts.

4. The method of claim 3, wherein testing the different candidate picker expertise tags comprises:
    applying A/B testing to select and test two or more different candidate picker expertise tags for different subsets of orders in respective user-order cohorts.

5. The method of claim 3, wherein testing the different candidate picker expertise tags comprises:
    applying a multi-arm bandit algorithm to test performance of two or more different picker expertise tags for each of the user-order cohorts and learn the trained model.

6. The method of claim 1, wherein identifying a picker assigned to fulfill the order comprises:
    selecting one or more expertise tags for each of a plurality of candidate pickers;
    applying a second model trained to output a score for a picker fulfilling an order based on one or more expertise tags selected for the order; and
    selecting the identified picker from the candidate pickers based at least in part on the scores.

7. The method of claim 1, wherein sending, to the user client device, the generated expertise tags comprises:

configuring a carousel user interface element with the generated expertise tags, wherein the carousel user interface element rotates between presentation of the generated expertise tags.

8. The method of claim 1, wherein the observed performance of expertise tags used for previous orders includes at least one of: an engagement rate with expertise tags by the user, tips submitted by the users for the pickers, and explicit feedback by the users about the pickers.

9. A non-transitory computer-readable storage medium storing instructions executable by one or more processors for performing steps including:
　receiving an order from a user of an online concierge system via a user client device, the order including one or more items from a warehouse for procurement and delivery to the user;
　identifying a picker assigned to fulfill the order;
　accessing a model trained to select one or more expertise tag templates from a plurality of expertise tag templates;
　applying the model to select one or more expertise tag templates for the received order, wherein the model selects the one or more expertise tag templates based on observed performance of expertise tags used for previous orders;
　generating one or more expertise tags for the identified picker, wherein each picker expertise tag contains information about the picker's historical fulfillment of orders inserted into the selected one or more expertise tag templates; and
　sending, to the user client device, the generated expertise tags, thereby causing the user client device to update a display having a limited display area to present the generated expertise tags to the user during procurement of the order.

10. The non-transitory computer-readable storage medium of claim 9, wherein applying the model to select one or more expertise tag templates for the received order comprises:
　assigning the order to a user-order cohort selected from a predefined set of user-order cohorts, wherein the order is assigned based at least in part on information about the user or information about the order; and
　providing the assigned user-order cohort to the model, wherein the model is trained to select the one or more expertise tag templates based on observed performance of expertise tags used for previous orders that are in the assigned user-order cohort.

11. The non-transitory computer-readable storage medium of claim 9, wherein the model is trained according to a process comprising:
　establishing a plurality of user-order cohorts representing groups of historical orders having similar characteristics relating to the historical orders and users placing the historical orders;
　testing, for each of the plurality of user-order cohorts, different candidate picker expertise tags and observing respective performance results; and
　learning the model based on observed relationships between the different candidate picker expertise tags and the respective performance results in respective contexts of the plurality of user-order cohorts.

12. The non-transitory computer-readable storage medium of claim 11, wherein testing the different candidate picker expertise tags comprises:
　applying A/B testing to select and test two or more different candidate picker expertise tags for different subsets of orders in respective user-order cohorts.

13. The non-transitory computer-readable storage medium of claim 11, wherein testing the different candidate picker expertise tags comprises:
　applying a multi-arm bandit algorithm to test performance of two or more different picker expertise tags for each of the user-order cohorts and learn the trained model.

14. The non-transitory computer-readable storage medium of claim 9, wherein identifying a picker assigned to fulfill the order comprises:
　selecting one or more expertise tags for each of a plurality of candidate pickers;
　applying a second model trained to output a score for a picker fulfilling an order based on one or more expertise tags selected for the order; and
　selecting the identified picker from the candidate pickers based at least in part on the scores.

15. The non-transitory computer-readable storage medium of claim 9, wherein sending, to the user client device, the generated expertise tags comprises:
　configuring a carousel user interface element with the generated expertise tags, wherein the carousel user interface element rotates between presentation of the generated expertise tags.

16. The non-transitory computer-readable storage medium of claim 9, wherein the observed performance of expertise tags used for previous orders includes at least one of: an engagement rate with expertise tags by the user, tips submitted by the users for the pickers, and explicit feedback by the users about the pickers.

17. A computer system comprising:
　one or more processors; and
　a non-transitory computer-readable storage medium storing instructions executable by the one or more processors for performing steps including:
　　receiving an order from a user of an online concierge system via a user client device, the order including one or more items from a warehouse for procurement and delivery to the user;
　　identifying a picker assigned to fulfill the order;
　　accessing a model trained to select one or more expertise tag templates from a plurality of expertise tag templates;
　　applying the model to select one or more expertise tag templates for the received order, wherein the model selects the one or more expertise tag templates based on observed performance of expertise tags used for previous orders;
　　generating one or more expertise tags for the identified picker, wherein each picker expertise tag contains information about the picker's historical fulfillment of orders inserted into the selected one or more expertise tag templates; and
　　sending, to the user client device, the generated expertise tags, thereby causing the user client device to update a display having a limited display area to present the generated expertise tags to the user during procurement of the order.

18. The computer system of claim 17, wherein applying the model to select one or more expertise tag templates for the received order comprises:
　assigning the order to a user-order cohort selected from a predefined set of user-order cohorts, wherein the order is assigned based at least in part on information about the user or information about the order; and providing the assigned user-order cohort to the model, wherein the model is trained to select the one or more expertise tag templates based on observed performance of expertise tags used for previous orders that are in the assigned user-order cohort.

19. The computer system of claim 17, wherein the model is trained according to a process comprising:
 establishing a plurality of user-order cohorts representing groups of historical orders having similar characteristics relating to the historical orders and users placing the historical orders;
 testing, for each of the plurality of user-order cohorts, different candidate picker expertise tags and observing respective performance results; and
 learning the model based on observed relationships between the different candidate picker expertise tags and the respective performance results in respective contexts of the plurality of user-order cohorts.

20. The computer system of claim 17, wherein identifying a picker assigned to fulfill the order comprises:
 selecting one or more expertise tags for each of a plurality of candidate pickers;
 applying a second model trained to output a score for a picker fulfilling an order based on one or more expertise tags selected for the order; and
 selecting the identified picker from the candidate pickers based at least in part on the scores.

* * * * *